United States Patent [19]
Lockyer et al.

[11] 3,924,178
[45] Dec. 2, 1975

[54] RELAY TESTER

[75] Inventors: John Lockyer, Smithtown; Thomas C. Cleary, Northport, both of N.Y.

[73] Assignee: Deutsch Relays, Inc., E. Northport, N.Y.

[22] Filed: July 3, 1974

[21] Appl. No.: 485,332

[52] U.S. Cl............................ 324/28 R; 324/28 CB
[51] Int. Cl.²........................................ G01R 31/02
[58] Field of Search......... 324/28 R, 28 CB, 28 CH, 324/28 CR, 28 RS, 28 SE

[56] References Cited
UNITED STATES PATENTS

| | | | |
|---|---|---|---|
| 2,309,044 | 1/1943 | Burton | 324/28 R |
| 2,432,092 | 12/1947 | Ferrell | 324/28 R |
| 2,590,228 | 3/1952 | Brown | 324/28 R |
| 2,806,186 | 9/1957 | Brown et al. | 324/28 R |
| 3,440,524 | 4/1969 | DeJarld et al. | 324/28 SE |

OTHER PUBLICATIONS

Design Trends, Cameron et al., Electro Technology, Mar. 1961, pages 156, 157.

Primary Examiner—R. V. Rolinec
Assistant Examiner—Michael J. Tokar
Attorney, Agent, or Firm—Gausewitz, Carr & Rothenberg

[57] ABSTRACT

A two coil latching relay is dynamically tested by application of a pattern of test and switching pulses that test both the response of the relay to a switching pulse intended to drive it from one state to the other and also test dynamic characteristics related to an improperly weak magnetic holding force exerted by the magnetic circuit and permanent magnet of the relay armature. Each coil is first energized with a small magnitude test pulse that is not sufficient to overcome the nominal holding force of the permanent magnet circuit and then is energized with a switching pulse sufficient to drive the armature from one position to the other. The state of all of the movable contacts of a multi-pole, multi-throw relay are monitored upon occurrence of or immediately after application of each pulse of the pattern.

12 Claims, 4 Drawing Figures

RELAY TESTER

BACKGROUND OF THE INVENTION

1. Field of the Invention

This invention relates to testing of electrical components and more particularly concerns methods and apparatus for dynamic testing of relays.

2. Description of Prior Art

Relays are fundamentally monostable or bistable devices that find an exceedingly wide application as electrically controlled switching devices. Increasingly stringent operating requirements are required in part by greater complexity of sophisticated applications, such as aircraft, spacecraft and satellites, and in part by the continued miniaturization. For these reasons, among others, manufacture and assembly of these devices is increasingly subject to errors that are difficult to detect. Accordingly, it becomes even more important to fully and thoroughly test high quality relays.

Optical techniques are employed for inspection of configuration and other characteristics, but actual tests of operation remain one of the more reliable sources of information relating to quality of the devices. Various types of relay operation testing have been devised.

For example, in the patent to Heilweil et al U.S. Pat. No. 3,253,214, a logic circuit is employed to test both the opening and the closing of a relay reed switch. When the relay coil is energized, the switch is operated to one condition. When the coil is deenergized, the switch is operated to another condition. The U.S. Pat. No. 2,309,044 to Burton illustrates the use of a comparison circuit for comparing either the operation or release of the relay contacts upon energization or deenergization of its winding. The U.S. Pat. No. 3,355,660 to Drazic describes the testing of relay contacts for chatter employing flip-flops and a gate operable via the relay contacts to indicate chattering of the contacts. The U.S. Pat. No. 2,833,983 to Shaw describes an arrangement for testing contacts of a number of relays so that testing may proceed without delaying manufacture.

The above-identified patents are merely illustrative of known arrangements and methods for relay testing but all fail in one major respect. In the prior art testing of relays the strength of the permanent magnet, or the proper arrangement and configuration of the magnetic circuit has not been tested except as it is involved in actuation of the relay to shift its movable armature and contacts from one position to another.

In many types of relays, a permanent magnet is arranged in a magnetic circuit to hold the movable armature of the relay in one position or another. In some relays, the magnetic circuit will hold the armature in either one of two positions to which it may be driven. A short duration pulse is applied to energize the relay coil or coils and thus overcome the holding force of the permanent magnet to drive the relay armature, and thus the movable contacts, from one position to another. Conventional testing methods will determine whether a driving or switching pulse applied to the relay coil or coils does, in fact, achieve the desired switching of the relay, to drive the armature from one position to another. Nevertheless, if the permanent magnet of such a relay should be too weak, or if the magnetic circuit is so distorted that air gaps are small where they should be large and vice versa, the relay may be defective and unacceptable. Environmental vibration may overcome a weakened magnetic holding force of the relay. An excessively large driving pulse may cause the armature to bounce from a position to which it is driven so as to either return to the first position or possibly to stop at some intermediate position in which no contact is made between the movable contact and any fixed contact. Such weakened magnetic holding force is not detected or monitored in the arrangements of the patents identified above, nor in any other commonly employed relay testing methods or apparatus.

Accordingly, it is an object of the present invention to provide for testing of a relay that will assist in determining quality of both its switching operation and its magnetic circuit.

SUMMARY OF THE INVENTION

In carrying out principles of the present invention in accordance with an exemplary embodiment thereof, methods and apparatus are provided for testing characteristics of a relay of the type having a permanent magnet for magnetically holding an armature in a first position and a coil adapted to be energized with a signal of a switching magnitude sufficient to overcome the nominal magnetic holding force of the permanent magnet. With the armature in the position from which it is adapted to be driven by a switching pulse, the coil is energized with a test pulse having a magnitude less than the magnitude required to overcome the nominal magnetic holding force exerted by the permanent magnet. The armature position after energization by the test pulse is monitored to detect a weakened magnetic holding force which is signalled by the switching of the armature from the first position in response to application of the low magnitude test pulse. According to additional features of the invention, a pattern of pulses is applied to both latch and reset coils of a latching relay so that pulse pairs are applied to the two coils in sequence, each pair of pulses comprising a low magnitude test pulse and a relatively large magnitude switching pulse. The position of the relay armature, the relay state, is monitored upon occurrence of each pulse of each pair.

DETAILED DESCRIPTION

Figure 1:
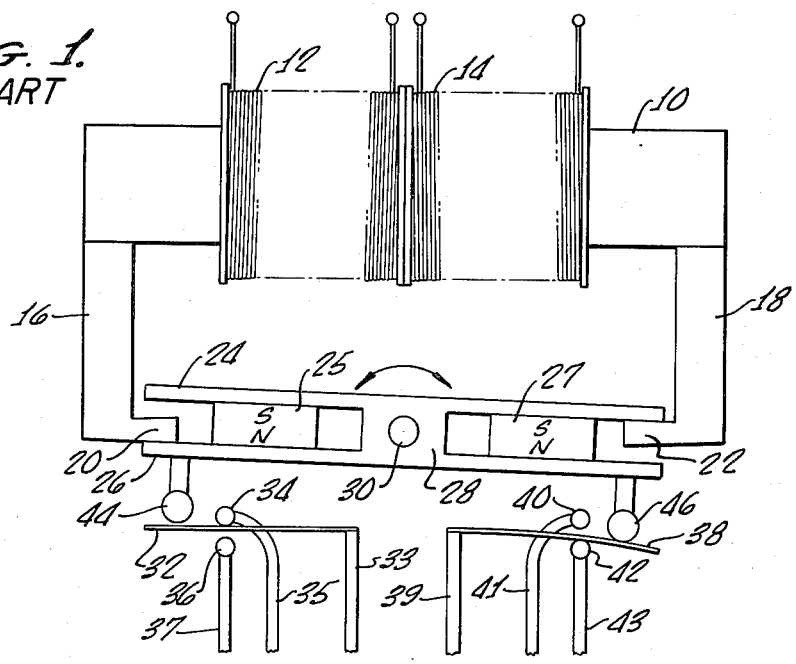
FIG. 1 is a schematic illustration of a latching relay that is illustrative of one of several types of relays to which principles of the present invention may be applied.

Although methods and apparatus of the present invention may be applied for the testing of different types of both monostable and bistable, single pole and multipole relays, a specific embodiment has been designed for testing of a miniature latching relay and accordingly, a preferred embodiment of the invention will be described for this application.

A typical latching relay is shown in U.S. Pat. No. 3,516,035 to Josenhans and schematically illustrated in FIG. 1 of the present application. The relay of this Josenhans patent comprises a magnetic core 10 upon which are wound a latch coil 12 and a reset coil 14 and having a pair of pole pieces 16, 18 with angulated legs 20, 22 fixed to opposite ends of the core. Legs 20, 22 extend between a pair of fixedly connected but mutually spaced magnetic armature plates 24, 26 that are mounted by means of a bearing block 28 for pivotal motion about an axis 30 which is perpendicular to the plane of the paper.

A first movable contact in the form of a flexible leaf spring 32 is connected to a relay terminal 33 and mounted for motion between first and second positions in which it is in contact with fixed contacts 34, 36, respectively connected to relay output terminals 35, 37.

In this two-pole double throw relay a second leaf spring type movable contact 38 is connected to an output terminal 39 and is mounted for motion between first and second fixed contacts 40, 42 that are connected to relay terminals 41, 43 respectively.

Armature plate 26 carries at its opposite ends a pair of actuating beads 44, 46 that alternatively move the respective spring contacts 32, 38 from their unstressed position in contact with an upper one of these fixed contacts (as illustrated in FIG. 1 in connection with contacts 32, 34) to a resiliently deformed position in electrical contact with the lower of the two fixed associated contacts (as illustrated with respect to contacts 38, 42 of FIG. 1).

A pair of permanent magnets 25, 27 mounted between the armature plates 24, 26 hold the armature in one or the other of its two stable positions of pivotal motion. In one such position (shown in FIG. 1), pole piece leg 20 is in substantial contact with armature plate 26 and pole piece 22 is in contact with armature plate 24. Upon application of a short duration switching pulse of a predetermined minimum magnitude to one of the coils 12, 14, the armature is driven in a counterclockwise direction from the position illustrated in FIG. 1 to its second stable condition or state (not shown) wherein pole piece leg 20 is in contact with armature plate 24 and pole piece leg 22 is in contact with armature plate 26. As the armature moves to such position from the position illustrated in FIG. 1, actuating bead 46 releases movable contact 38 which then engages fixed contact 40 and, at the same time, actuating bead 44 depresses the flexible spring type contact 32 downwardly into engagement with fixed contact 36, disengaging the movable contact 32 from fixed contact 34.

Upon de-energization of the coil that has been driven by the switching pulse, the permanent magnet provides a nominal magnetic holding force sufficient to hold the relay in the given state and the armature in the position to which it has been driven, even in the presence of substantial vibration. The switching pulse applied to the appropriate coil causes the coil to produce a magnetic force in opposition to the holding force of the permanent magnet, and of a magnitude sufficient to overcome the nominal permanent magnet holding force. Thus, the armature is pivoted from one position to the other. If the switching pulse should be too large, the armature may tend to rebound from a position to which it is driven. However, the permanent magnet provides a nominal holding force sufficient to prevent such rebound under most circumstances, or within a reasonably wide range of switching pulse variations. Accordingly, if the permanent magnet 25 or 27 or both, are too weak, and exert a holding force less than a predetermined nominal holding force, or if the magnetic circuit of armature, pole pieces and core is defective, it is possible that the relay may be inoperable, at least occasionally. Therefore, the relay is unacceptable for many applications because it may move from one position to another when subject to external vibrations or it may be caused to rebound from a driven position by application of a switching pulse of too large a magnitude.

According to principles of the present invention a latching relay such as that illustrated in FIG. 1 may be dynamically tested, that is, its characteristics may be tested to determined whether or not the magnetic holding force is of a proper magnitude. Such testing of the magnetic circuit will enable detection of an improper magnetic circuit caused by one or both of the permanent magnets being too weak, or by a distortion of the magnetic paths causing improper magnitude of the air gap between the legs 20, 22 of the pole pieces and the respective armature plates 24, 26. Improper air gaps may be due to twisting or bending of the pole pieces or armature plates, or foreign matter in the air gaps. A defect that provides an unexpectedly high magnetic reluctance in the magnetic circuit of the armature, pole pieces and core would be manifested as a weakened magnetic holding force and thus is discoverable by testing according to the present invention. Improper mounting of different subassemblies of the relay may also contribute a weakened magnetic holding force which is detected or detectable by the methods and apparatus of the present invention.

The magnetic circuit of the relay in reset state includes a flux path between pole piece 20 and armature plate 26 at one end and between pole piece 22 and armature plate 24 at the other end. In latch state, this flux path is not the same, and therefore, it is necessary to test the magnetic circuit in both latch and reset conditions.

A feature of this testing is that the magnetic circuit testing is combined with testing to ascertain that the relay does, in fact, move from one position to the other upon command. Both aspects of the testing are conveniently combined in a simple program of pulse patterns so that comprehensive testing of the relay is rapidly achieved.

Figure 2:
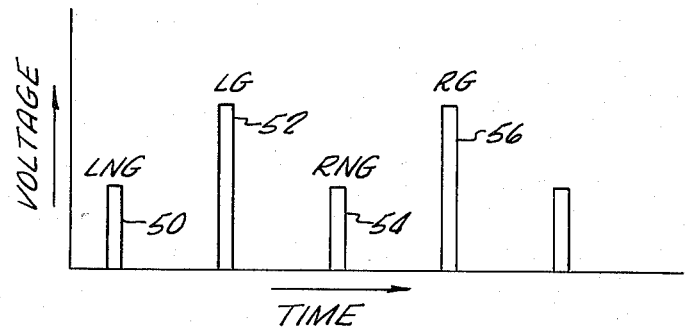
FIG. 2 shows a pulse pattern employed for testing the relay.

For testing according to principles of the present invention, a pulse pattern of the type illustrated in FIG. 2 is applied to the latch and reset coils of the relay. The pulse pattern comprises first and second pairs of pulses, the first pair being constituted by a test pulse 50 which is followed by a switching pulse 52. The second pair is substantially similar to the first pair where the latch and reset coils are substantially identical and includes a test pulse 54 and a switching pulse 56. Preferably, each switching pulse 52 and 56 has a magnitude sufficient to cause the coil to which it is applied to overcome the nominal holding force of the permanent magnets and drive the armature from one position to the other position where it will remain upon termination of such switching pulse. The test pulses 50 and 54 each has a magnitude considerably less than the magnitude of the switching pulse and preferably in the order of about one-half such magnitude. These test pulses 50 and 54 have a magnitude that will cause the respective coils, latch coil 12 or reset coil 14, to exert a magnetic force in opposition to the holding force of the permanent magnets that is slightly less than the magnitude required to overcome the nominal holding force. Therefore, if the relay is of good quality and its magnetic circuit properly arranged and constructed, application of the test pulses 50 and 54 will not switch the relay from one state to another. Magnitude of each test pulse may be increased as more stringent testing is desired and decreased as test requirements are relaxed, but always ensuring that the test pulse magnitude is not sufficient to cause the nominal magnetic holding force to be overcome.

The pulse pattern of two pairs of pulses may be applied once or several times (if repetitive testing of a single relay is desired). One set of two pairs of pulses comprises a single complete test cycle which accordingly may be repeated several times for testing of a single relay. Upon application of each pulse of a single cycle, the state of the relay is monitored and compared with the most recently applied pulse of the pattern. As will be more particularly described below, all movable contacts of a multi-pole relay are simultaneously monitored so that this test program will also detect individual failures of single contact sets of a relay.

Although frequency, spacing and pulse widths and magnitudes may be determined according to the particular relay under test and according to specific operating characteristics or design characteristics, an exemplary relay may be tested by application of pulses having a duration of 25 milliseconds each spaced from an adjacent pulse by 100 milliseconds (for a pulse repetition rate of 8 Hertz). Pulse magnitudes may vary widely, as required by the particular relay, from ½ volt for example, to as high as 100 volts for larger relays, although, in general, the test pulse, suh as pulse 50, will have a magnitude of about one-half of the magnitude of the switching pulse 52. In any event, the test pulse has a magnitude less than that required to overcome the nominal magnetic holding force of the permanent magnetic circuit.

Figure 3:
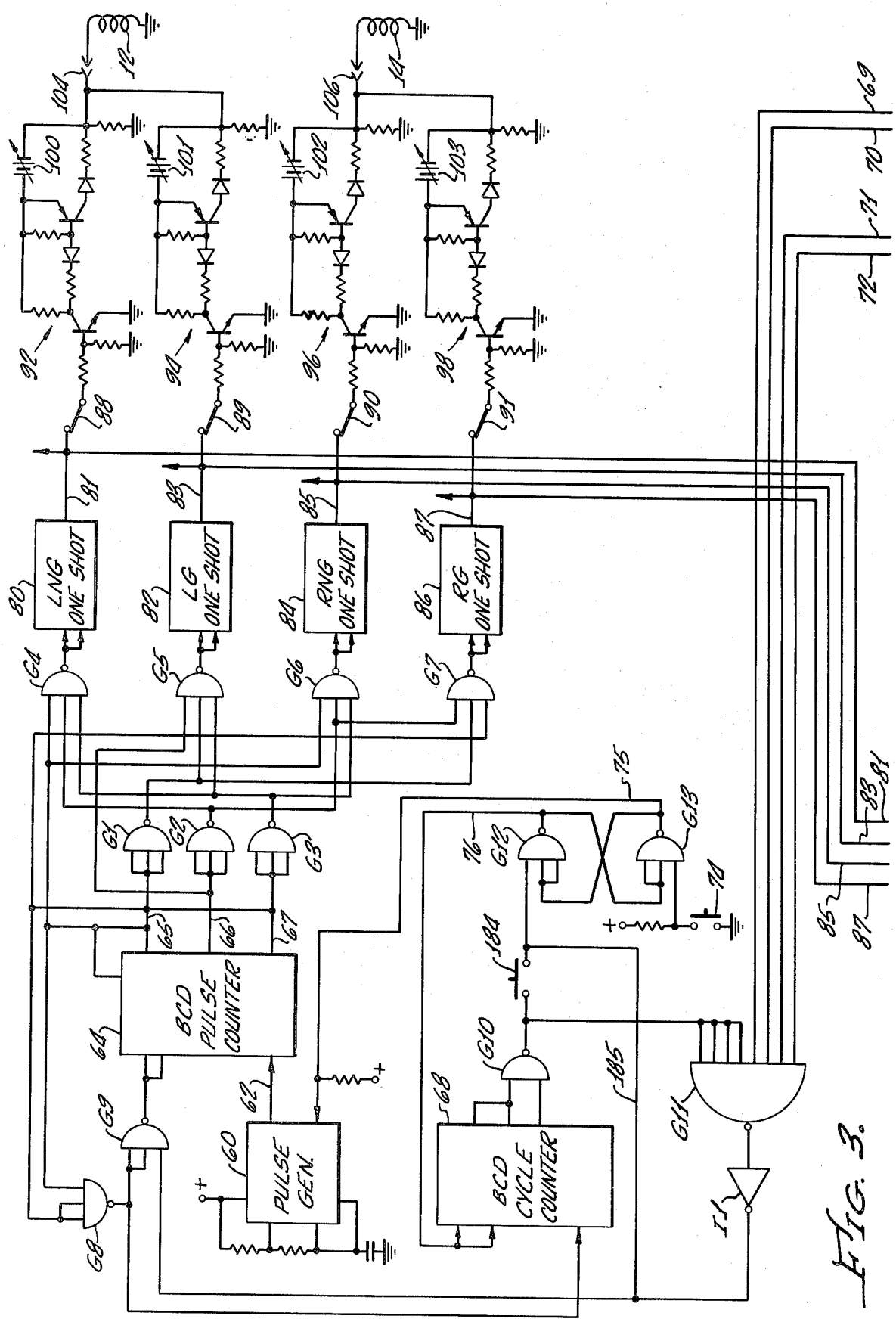
FIGS. 3 and 4 together comprise a diagram of circuitry of testing apparatus embodying principles of this invention.
Figure 4:
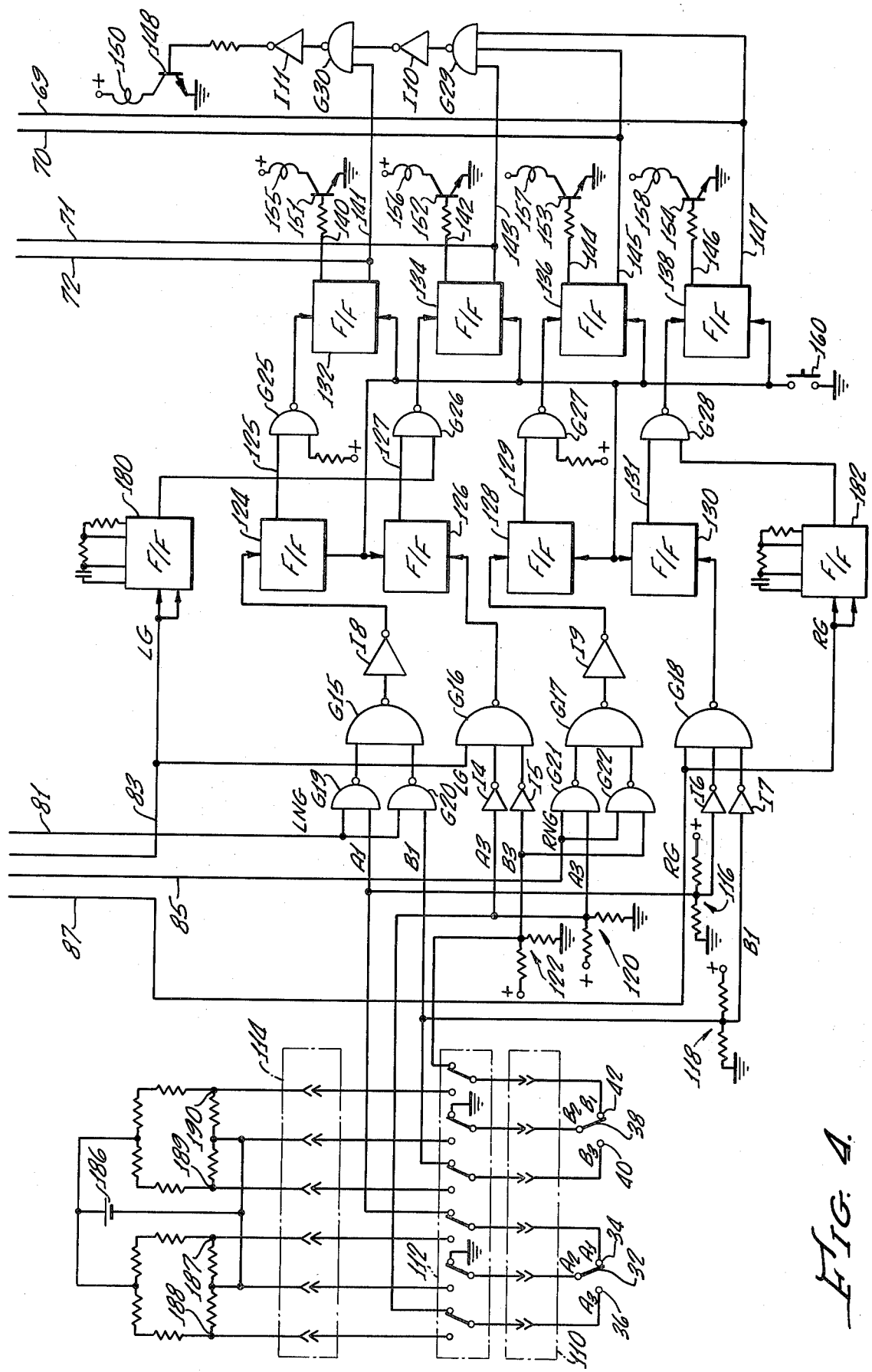

FIGS. 3 and 4 collectively illustrate a specific mechanization of a system for generating and applying the described test pulse pattern to the relay and monitoring the relay state to determine whether the relay has operated properly or has failed to operate when commanded. The two figures form a single circuit when FIG. 3 is positioned above FIG. 4.

A pulse generator 60 provides a counting input on line 62 to a binary coded decimal pulse counter 64 having binary coded outputs on lines 65, 66 and 67, respectively representing decimal 1, decimal 2 and decimal 4. The binary coded outputs of the counter are fed to a decoder comprising a plurality of three input NAND gates, G1, G2, G3, G4, G5, G6 and G7, of the type used throughout the circuit. Each such gate provides a low output if and only if all of its inputs are high. It provides a high output when one or more of its inputs is low. Counting outputs of the counter are indicated by high or positive pulses. Gates G1, G2 and G3 are connected as inverters, providing inverted inputs of the counter outputs to the respective gates G4, G5, G6 and G7. Consequently, the outputs of gates G4 through G7 are normally each high, but will go low when all of the inputs thereto are high, which uniquely occurs on the respective counts of the counter. Thus, upon the count of one, the output of G4 uniquely is low. Upon the count of two, the output of G5 is uniquely low and similarly with gates G6 and G7 at the count of three and four, respectively. At the count of five, both inputs to a gate G8 from lines 65 and 67 of the counter are high to provide a low input to a reset gate G9 to thereby provide a high output from this gate to reset the counter 64. Thereupon the counter again commences to count through its count of five.

Each low output from gate G8, at the count of five of counter 64, is also fed to a cycle counter 68 which may be identical to the pulse counter 64. The outputs of the cycle counter are fed to the inputs of a NAND gate G10 as illustrated to provide an output from this NAND gate which remains high through the first four counts of the cycle counter and then, upon the count of five (cycles), goes low. During the first four cycles, the high output of gate G10 provides a high input to a multiple input NAND gate G11 having four additional inputs on lines 69, 70, 71 and 72, that carry signals representing results of the test as will be described more particularly below. If test results indicate that the relay is in proper operating condition, all of lines 69 through 72 at the end of the first cycle are high and remain high. Thus, through the first four test cycles, the output of gate G11 is low to provide a high output from an inverter I1. Upon counting of the fifth cycle of the cycle counter, the output of gate G11 goes high to provide a low input to the second input terminal of gate G9. Accordingly, a high output is fed to reset the pulse counter 64.

The normally high output of inverter I1, which is uniquely low at the end of the fifth cycle, is also fed to one input of a gate G12 that is interconnected with a gate G13 to provide a start flip-flop. The test circuit is started by momentarily operating a start switch 74 to provide a low input to gate G13 and a high enabling signal via line 75 to the pulse generator 60. Accordingly, upon momentary operation of button 74, the pulse generator begins its count and will continue to operate until the signal on line 75 goes low. Upon occurrence of the fifth count of the cycle counter 68, a low input is provided from I1 to the gate G12 (which has a high input from gate G13) to thereby provide a high signal via line 76 to reset cycle counter 68 and to reset the start flip-flop which provides a low input on line 75 to disable the pulse generator 60. The second input to G13, in the absence of the momentary operation start switch 74, is connected to a positive supply.

During operation of the cycle counter, until it counts the fifth cycle, the output of gate G11 is low unless there is a failure indication on one of lines 69 through 72, in which case the output of gate G11 goes high to terminate the test by resetting the counters and stopping the pulse generator. Accordingly, the arrangement will provide five cycles of four successive counts from the gates G4 through G7 and then automatically shut off, unless sooner terminated by a fault indication.

The uniquely negative outputs of gates G4 through G7 are respectively applied to trigger respective monostable multivibrators or oneshots 80, 82, 84, 86, which may be termed respectively, LNG, LG, RNG and RG, since they provide the timing for the latch/no go testing, latch/go testing, reset/no go testing, and reset/go testing, respectively. The oneshots provide high output pulses, when triggered, preferably of a 25 millisecond duration, which are respectively fed via lines 81, 83, 85, 87 and calibration switches 88, 89, 90 and 91 to respective two-stage pulse shaping circuits 92, 94, 96 and 98 which control current flow from adjustable power supplies 100, 101, 102, 103, respectively. In effect, the pulse shaping circuits 92, 94, 96 and 98 gate a voltage selected by adjustment of the associated power supply, under control of outputs of the oneshots 80, 82, 84, 86 respectively. The gated signals are fed to the relay coils. Outputs of pulse shaping circuits 92, 94 are connected together and to the latch coil 12 and outputs of the pulse shaping circuits 96, 98 are connected together and to the latch coil 14 of the relay under test, via connectors 104, 106. Accordingly, relay coils 12 are energized by pulses 50 and 52 (FIG. 2) in sequence and, thereafter, relay coil 14 is energized by pulses 54, 56 to complete a first test cycle. The test cycle is repeated five times if no fault is indicated, whereupon the test is automatically terminated.

To compare the actual position of the movable relay contacts with a position commanded by the particular pulse applied to the several coils, the relay contacts are connected as illustrated at the left side of FIG. 4, being coupled by connectors indicated in dotted box 110, switches indicated in dotted box 112, and additional connectors indicated in dotted box 114. Movable contacts 32, 38 of FIG. 1 are represented by points A2, B2, and the corresponding fixed contacts are represented by points A1, A3 and B1, B3. Two modes of test operation are available, a lamp indicating mode and a recording mode. With the connections made as shown and switches 112 in the position illustrated in FIG. 4, the system is in the lamp indicating mode. Movable contact terminals A2 and B2 are connected in common to ground (via connectors 110 and switches 112). Each of the fixed contacts is connected (via connectors 110 and switches 112) to the junction of a pair of equal value resistors of a respective one of a plurality of voltage dividers 116, 118, 120 and 122, connected respectively between ground and a voltage source such as 10 volts positive, for example. The signals appearing at the respective junctions of the several voltage dividers are termed A1 for divider 116, B1 for divider 118, A3 for divider 120, and B3 for divider 122. The signals A1, B1, A3, B3 denote the state of the relay and are termed herein relay state signals. Pulses of a single cycle of the pulse pattern are termed, respectively, LNG for the latch/no go, LG for the latch/go, RNG for the reset/no go and RG for the reset/go pulse.

Considering the relay contacts in the position illustrated in FIG. 4 represent the reset condition or state of the relay, relay state signals A1, B1 are substantially 0 volts or ground since fixed contacts 34 and 42 at which these state signals are derived are connected directly to ground by means of movable contacts 32, 38, connectors 110 and switches 112. Similarly, the relay state signals A3, B3 are approximately at 5 volts (for a 10 volt voltage divider supply and equal resistors of the voltage dividers). Thus, in the reset position illustrated, the relay state signals A3 and B3 are high, above ground, and the relay state signals A1, B1 are low, ground. Upon switching of the relay to the latch position, signals A1 and B1 go high and both A3 and B3 are low. These state signals are monitored by the logic that will now be described.

Monitoring logic for detecting relay response to the test pulse pattern is provided by a plurality of two input NAND gates G15, G16, G17, G18 of which G15 and G17 have inputs from NAND gate pairs G19, G20 and G21, G22, whereas gates G16 and G18 have inputs from inverters I4, I5 and I6, I7. Gates G16 and G18 also have inputs from the test pulse pattern sequence control pulses LG, RG, respectively, via lines 83, 87. Control pulse LNG and RNG are fed to G15 and G17 from lines 81, 85 via G19 and G21. Other inputs to the several gates and inverters are as indicated on the drawing. The arrangement is such as to compare the occurrence of each of the sequence control pulses LNG, LG, RNG, RG, respectively, with predetermined relay state signals. Thus, the pulse LNG is fed to the first comparator, comprising G15, G19 and G20, together with relay state signals A1 and B1. Pulse LG is fed to the second comparator, comprising G16, I4 and I5, together with relay state signals A3 and B3, pulse RNG is fed to the third comparator, comprising G17, G21 and G22, together with relay state signals A3 and B3, and pulse RG is fed to the fourth comparator, comprising G18, I6 and I7, together with relay state signals A1 and B1. The output of the comparators, at gates G15 through G18, respectively, are normally low and fed to a plurality of flip-flops 124, 126, 128 and 130. Flip-flops 124 and 128 toggle (change state) in response to negative going pulses. The flip-flops do not toggle in response to high inputs.

The outputs of the several flip-flops are fed through NAND gates G25, G26, G27 and G28 which provide inputs to respective lamp flip-flops 132, 134, 136, 138. Lamp flip-flops 132, 134, 136 and 138 have output lines 141, 143, 145, and 147 which are fed to a coincidence circuit including a NAND gate G29, an inverter I10, a NAND gate G30 and an inverter I11, which are connected to drive a transistor 148 that operates an "all go" light 150.

Output lines 140, 142 and 144, 146 of the lamp flip-flops are connected via respective transistor lamp drivers 151, 152, 153 and 154 to operate lamps 155, 156, 157 and 158, respectively, to indicate a particular failed, or no go condition.

The various circuit elements employed in the construction of the circuit illustrated in FIGS. 3 and 4 are integrated circuit chips of the type known as DIP Commercial Temperature TTL and MSI units manufactured by several manufacturers, Signetics, Texas Instruments, or Fairchild. The flip-flops are dual D flip-flops model 7474, the two input NAND gates are model 7400, the three input NAND gates are model 7410, the inverters are model 7404, the oneshot multivibrators are model 74121, the multiple input NAND gate G11 is model 7430, the binary coded decimal counters are each model 7490, and the pulse generator made by Signetics is model 555. The identified integrated circuit chips are only exemplary of many of the existing circuits that may be employed in a system that mechanizes principles of the present invention as will be readily apparent to those skilled in the art.

The several flip-flops are reset by a reset button 160 which feeds a negative pulse to place all of the flip-flops in their normal condition (which is not the same for all flip-flops, as described below).

Upon reset of the flip-flops by operation of button 160, output lines 125 and 129 of flip-flops 124, 128 are low and normally remain in such a low condition unless and until a failure is indicated. Upon the same reset, because of the circuit connections of flip-flops 126 and 130, their output lines 127 and 131 are high and remain high unless there is a failure indicated. Upon occurrence of a first pulse of a test pattern, the LNG pulse, and assuming the relay initially to be in the reset condition illustrated in the drawing, so that signals A1 and B1 are ground, gate G19 has a high input and a low input. Likewise gate G20 has a high input and a low input, to provide two high inputs to gate G15 and a low to inverter 18 which provides a high to the toggle input of flip-flop 124. The flip-flop toggles only upon receipt of a negative going input and thus remains unchanged. However, if either relay state signal A1 or B1 should be high during the occurrence of the test pulse LNG, signifying a failure condition, one of the inputs to G15 goes low, its output goes high and a low input is provided to toggle the flip-flop 124. This provides a second high input to gate G25 and a low or toggle input to lamp flip-flip 132, whereupon its output on line 140 goes high to light the lamp and signify LNG failure. A first input to G25 is always high by connection to a positive voltage supply.

Upon occurrence of the second pulse of the test pattern, the LG signal, a first input to gate G16 is high and, assuming the relay under test to be in good condition, both A3 and B3 are now low to provide two additional high inputs to G16 and a low output from G16 to toggle flip-flop 126. This low output of G16 signifies that the LG test pulse switched the relay state. Thus, flip-flop 126 is toggled upon occurrence of the LG pulse if the relay is in good condition. Output of flip-flop 126 goes from its normally high condition to a low condition. Gate G26 has a second input from a oneshot or monostable multivibrator 180 that is triggered by the latch LG test pulse to provide a positive going output pulse of approximately 1 millisecond duration. The output of oneshot 180 is low until it is triggered by LG and thus, one input to G26 is normally low until the occurrence of LG whereby its output is high. Upon occurrence of the LG test pulse, the input to G26 from oneshot 180 is high and if the relay shows a good condition at this time, flip-flop 126 is toggled and its output to G26 goes low. Accordingly, the latter still has a low output and flip-flop 134 is not toggled. If, however, the relay fails to change state upon occurrence of LG, A3 or B3 is high and the output of G16 remains high. Consequently, flip-flop 126 is not toggled. There are now two high inputs to G26 which provides a low input to toggle flip-flop 134 and provide a high lamp lighting input to the circuit 152.

The reset/no go comparator channel including gate G17, flip-flops 128, 136, and lamp circuit 157, operates substantially the same as the latch/no go comparator channel. The reset/go channel of the comparator comprising gate G18, flip-flops 130 and 138 and lamp circuit 154 operates in the same manner as the latch/go channel.

In the reset/go channel, one input to gate G28 is normally low and uniquely high upon occurrence of RG, by connection to the output of a second oneshot 182 that is triggered by RG at the output (line 87) of oneshot 86. Oneshot 182 is identical to oneshot 180 and performs the same function for the RG comparison channel as does the oneshot 180 for the LG comparator channel.

Flip-flops 124 and 128 as indicated above, are conditioned upon actuation of reset button 160 to provide a low output to the respective gates G25 and G27, whereas because of their circuit connections, flip-flops 126 and 130 are conditions by reset to provide a normally high output and are uniquely toggled to provide a low output upon occurrence of the associated test pulse. Flip-flops 124 and 130, on the other hand do not toggle unless a failed condition is indicated in response to the associated test pulse.

In order to indicate completion of four test pulses of a single test cycle in which all comparisons indicate a good relay, all of the output lines 141, 143, 145 and 147 of output flip-flops 132, 134, 136 and 138 which are normally high, are connected so as to normally operate the all go lamp driving transistor 148. Lamp 150 is normally energized and will remain energized by transistor 148 unless and until one of the lines 141, 143, 145 or 147 goes low due to toggling of its associated flip-flop upon a failure indication in response to one of the test pulses.

The normally high outputs from lines 141, 143, 145 and 147 of the output flip-flops are fed via lines 69, 70, 71, 72 as inputs to the multiple input AND gate G11 (FIG. 3) as previously described. Accordingly, if all of the signals on lines 69 through 72 remain high, the apparatus will continue to test for five full cycles, whereas if comparison should indicate a failure of any type and one of the lines 69 through 72 goes low, testing is automatically stopped.

The above-described operation is termed a lamp mode since visual indications of go, no go are provided by the described lamps. Testing and test results may be recorded (operation in record mode) by closing a switch 184 (FIG. 3) connected between the output of cycle counter decoding gate G10 and the input of gate G12 of the start flip-flop. Closing of switch 184 also operates all contacts in dotted box 112 (FIG. 4) by suitable means (not shown) to disconnect the relay terminals under test from the comparison channels that drive the several lamps and, instead, to connect these relay terminals via connectors in dotted box 114 to a second set of voltage divider circuits which is functionally identical to the set of voltage divider circuits 116, 118, 120 and 122. In this record mode, the movable relay contacts that provide the signals A2, B2 are connected to each other and to the negative side of a voltage supply 186 whereas the contacts at which appear signals A1, A3, B1 and B3 are connected to intermediate points 187, 188, 189 and 190 of voltage dividers each having one side connected in common to the positive side of supply 186 and the other side thereof connected in common to the negative side of the supply 186. Signals representing the test pulses LNG, LG, RNG and RG are derived directly from the outputs of the several oneshot multivibrators 80, 82, 84 and 86, thus recording is achieved of each of the test pulses and of each of the relay state signals A1, A3, B1 and B3 upon occurrence of the respective pulses of each test cycle.

In this record mode, the cycle control gate G11 (FIG. 3) is bypassed by a line 185 and removed from the start/stop circuit by the closure of switch 184, which remains closed during the record mode test. Thus, upon occurrence of a count of five at the cycle counter output, a low input is provided to G12 of the start flip-flop to provide a low output on line 75 to disable the pulse generator and a high output on line 76 to reset the cycle counter. In this mode, testing continues throughout five complete cycles regardless of whether or not a failure has been earlier indicated. Any failure that occurs during any part of the five test cycles will be indicated by the record mode of the relay state signals in timed relation to the test pulses.

A typical relay will complete its change of state within about 4 milliseconds from the leading edge of the substantially rectangular pulse provided by the pulse shaping circuits 92, 94, 96, 98. Therefore, if the relay does change state upon application of a test pulse to one of the relay coils, the test pulse, havig a duration in the order of 20 to 25 milliseconds, will still be high after the relay has changed and after the appropriate relay state signals have changed. Thus, the comparator outputs accurately reflect the relay state after the end of the required switching time.

It will be noted that the specified sequence of pulses of the pattern provides the most information in the shortest time and efficiently arranges the testing sequence to insure that the several pulses are applied to a proper quality relay in the appropriate latch or reset state thereof. Thus, the low magnitude test pulse is applied to each coil before the relatively high magnitude switching pulse is applied thereto so that if the relay is of a good quality, it remains in the state in which it will properly operate in response to the next succeeding pulse pattern. This next pulse drives it to its opposite state, where it is again in condition to be tested by the succeeding pulse which now is a no go or test pulse applied to the coil for such relay state. Thus, the specified sequencing of the several pulses takes advantage of the switching or failure to switch that the relay exhibits in response to the respective pulses.

The specific circuit illustrated in FIGS. 3 and 4 is employed with a relay having two movable contacts. It will be readily appreciated that a substantially similar circuit may be employed for monitoring a relay with three or more movable contacts and associated pairs of fixed contacts, by connecting all of such movable contacts together and to ground and by providing a separate and individual voltage divider having an intermediate point connected to each of the additional fixed contacts. For each additional movable contact and a pair of fixed contacts included in a relay under test, each comparator will have one additional relay state signal input so that each comparator has as many relay state signal inputs as there are movable contacts in the relay.

The foregoing detailed description is to be clearly understood as given by way of illustration and example only, the spirit and scope of this invention being limited solely by the appended claims.

What is claimed is:

1. The method of testing a relay of the type having a latch coil that is energized to drive the relay to a latching state and a reset coil that is energized to drive the relay to a reset state and having means for retaining the relay in either of said states upon de-energization of the coils, said method comprising the steps of sequentially energizing each of said coils with a pattern of energizing pulses, said pulse pattern for energizing each of said coils comprising at least one pulse having a relatively small magnitude that is less than the magnitude nominally required to drive the relay from one of said states to the other and another pulse having a relatively large magnitude that is at least equal to the magnitude nominally required to drive the relay from one of said states to the other, and monitoring the state achieved by the relay in response to application of said relatively small pulse and in response to application of said relatively large pulse.

2. The method of claim 1 wherein said pulse pattern is sequentially applied to said latch coil and said reset coil, one after the other.

3. The method of claim 1 wherein said relay includes a plurality of movable contacts, each shiftable between first and second positions as said relay is operated between said latching and reset states thereof, and wherein said step of monitoring the state of the relay comprises monitoring of a plurality of electrical circuits each connected respectively with an individual one of said movable contacts, whereby the positions of a plurality of said movable contacts are monitored upon application of each of said pulses to each of said coils.

4. The method of claim 1 wherein said relay includes an armature movable between first and second positions in response to energization of said latch and reset coils respectively, and including a magnetic circuit for exerting a magnetic holding force to retain the armature in either of said first and second positions, said pattern of pulses including a test pulse having a magnitude not greater than a magnitude sufficient to cause the coil energized thereby to exert a magnetic force that is considerably less than said magnetic holding force, said pattern of pulses further including a driving pulse having a magnitude sufficient to cause the coil energized thereby to exert a magnetic force on the armature sufficient to overcome the magnetic holding force.

5. The method of claim 4 wherein said relay includes a first pair of fixed contacts and a first movable contact cooperating therewith, a second pair of fixed contacts and a second movable contact cooperating therewith, and wherein said monitoring of the state of said relay comprises connecting said movable contacts to each other, connecting each of said fixed contacts to a voltage divider circuit, connecting an electrical circuit between said common connection of said movable contacts and one fixed contact of said first and second pairs of fixed contacts, and monitoring said electrical circuit.

6. Apparatus for testing a relay of the type having an armature movable to operate a movable contact between a first position in engagement with a fixed contact and a second position, a relay coil for driving the armature to move the movable contact between said first and second positions, and means for exerting a holding force for holding the armature and movable contact in one of said first and second positions in the absence of energization of said coil, said testing apparatus comprising a monitoring circuit, means for connecting said monitoring circuit to said fixed and movable contacts, means for energizing said coil with a pattern of pulses, a larger one of said pulses having a magnitude sufficient to cause the coil to exert a force great enough to overcome said holding force whereby the movable contact is moved from one of said positions to the other, said pattern of pulses including a smaller pulse having a considerably smaller magnitude that causes the coil to exert a magnetic force considerably less than said holding force, whereby said movable contact will be driven from one of said positions to the other upon application of said smaller magnitude pulse only if the relay is defective, means for obtaining a signal from said monitoring circuit representing the position of said movable contact, and means for comparing said signal with occurrence of each of said larger and smaller pulses of said pattern.

7. The testing apparatus of claim 6 wherein said relay is of the type having a latch coil and a reset coil, first and second movable contacts respectively movable between the contacts of first and second pairs of fixed contacts, said apparatus including means for connecting said movable contacts to a common point in said monitoring circuit, said monitoring circuit including means connected with one contact of each of said first and second pairs of fixed contacts for generating a first pair of relay state signals and further including means connected with a second contact of each of said first and second fixed contacts for generating a second pair of relay state signals, said means for energizing said coil with a pattern of pulses comprising means for generating first and second pairs of pulses, each said pair of pulses comprising one of said smaller pulses and one of said larger pulses, means for applying said first and second pairs of pulses to said latch and reset coils in sequence, and a plurality of comparison means, each said comparison means being individually responsive to one of the pulses of said first and second pairs of pulses and to respective pairs of said relay state signals for providing an output indicative of the quality of the relay upon occurrence of each of the pulses of said pattern of pulses.

8. For use with a two coil latching relay of the type having first and second pairs of fixed contacts, first and second movable contacts, an armature movable between latch and reset positions for moving said first and second movable contacts between positions in contact with different ones of said fixed contacts, a latch coil for driving the armature to a latch position and a reset coil for driving the armature to a reset position, and a magnetic circuit for exerting a holding force for holding the armature in either said latch position or said reset position when the coils are de-energized, testing apparatus comprising means for generating a pattern of successive pulses of which one pulse has a magnitude considerably less than the magnitude required to energize one of said coils to overcome said holding force, and a following pulse of said pattern having a magnitude sufficient to energize one of said coils to overcome the holding force and switch the armature from one of said positions to the other, means for applying said pattern sequentially to said latch and reset coils respectively, and means for monitoring the state of said relay upon occurrence of each of the pulses of a group of pulses of said pattern.

9. The apparatus of claim 8 wherein said pulse pattern comprises first and second sequential pairs of sequential pulses, each pair of pulses comprising a relatively small test pulse followed by a relatively large switching pulse, said first pair of pulses being applied to one of said coils and said second pair of pulses being applied to the other of said coils, whereby each of said coils is first tested by a low magnitude test pulse and then tested by a relatively large magnitude switching pulse.

10. For use with a two coil latching relay of the type having first and second pairs of fixed contacts, first and second movable contacts, an armature movable between latch and reset positions for moving said first and second movable contacts between positions in contact with different ones of said fixed contacts, a latch coil for driving the armature to a latch position and a reset coil for driving the armature to a reset position, and a magnetic circuit for exerting a holding force for holding the armature in either said latch position or said reset position when the coils are de-energized, testing apparatus comprising means for generating a pattern of successive pulses of which one pulse has a magnitude considerably less than the magnitude required to energize one of said coils to overcome said holding force, and a following pulse of said pattern having a magnitude sufficient to energize one of said coils to overcome the holding and switch the armature from said one of said force positions to the other, means for applying said pattern sequentially to said latch and reset coils respectively, and means for monitoring the state of said relay upon occurrence of each of the pulses of a group of pulses of said pattern, said pulse pattern comprising first and second sequential pairs of sequential pulses, each pair of pulses comprising a relatively small test pulse followed by a relatively large switching pulse, said first pair of pulses being applied to one of said coils and said second pair of pulses being applied to the other of said coils, whereby each of said coils is first tested by a low magnitude test pulse and then tested by a relatively large magnitude switching pulse, said means for monitoring including a monitoring circuit for deriving a plurality of relay state signals from each of said fixed contacts respectively and including means connected to both of said movable contacts, a plurality of logic comparison circuits each having an input from a respective one of the pulses of the pairs of pulses and also having second and third inputs from a first one of the contacts of the first pair of fixed contacts and from a first one of the contacts of the second pair of fixed contacts, whereby the quality of the relay is monitored upon the application of each test switching pulse to each of said latch and reset coils.

11. The apparatus of claim 10 wherein said means for generating said pattern of pulses comprises a pulse generator, a pulse counter responsive to said pulse generator for providing a plurality of sequential outputs, a cycle counter responsive to said pulse counter and providing a disable output to said pulse generator upon completion of a number of counts thereof, a plurality of pulse shaping circuits each responsive to a respective one of the outputs of said pulse counter, a plurality of voltage sources each providing an input to a respective one of said pulse shaping circuits, means for connecting a first pair of said pulse shaping circuits to said latch coil, and means for connecting a second pair of said pulse shaping circuits to said reset coil.

12. The apparatus of claim 10 wherein said monitoring circuit includes a first voltage divider having an intermediate point thereof connected to one contact of said first pair of fixed contacts, a second voltage divider having an intermediate point thereof connected to the other contact of said first pair of said fixed contacts, a third voltage divider having an intermediate point thereof connected to a first contact of said second pair of fixed contacts, a fourth voltage divider having an intermediate point thereof connected to the other contact of said second pair of said fixed contacts, means connecting said first and second movable contacts in common with one side of all of said voltage dividers, said logic comparison circuits comprising a first comparator having a first input from a first pulse of said pattern, and having second and third inputs from the intermediate points of two of said voltage dividers, a second comparator having a first input from a second one of the pulses of said pattern and having second and third inputs from the intermediate points of two of said voltage dividers, a third comparator having a first input from a third pulse of said pattern and having second and third inputs from the intermediate points of two of said voltage dividers, and a fourth comparator having a first input from a fourth pulse of said pattern and having second and third inputs from the intermediate points of two of said voltage dividers, a plurality of flip-flops each having an input from a respective one of said comparators, a plurality of relay quality display devices respectively connected to different ones of said flip-flops, a coincidence gate having inputs from each of said flip-flops and having an output, and a display device having an input from said coincidence circuit for indicating successful tests of said relay.

* * * * *